Patented Jan. 27, 1953

2,626,950

UNITED STATES PATENT OFFICE 2,626,950

2-HALOIMINO-4-THIAZOLINES

James T. Gregory, Akron, Ohio, assignor to The B. F. Goodrich Company, New York, N. Y., a corporation of New York No Drawing. Application October 31, 1950, Serial No. 193,282

6 Claims. (Cl. 260—306.7)

This invention relates to a new class of thiazoline compounds and more specifically pertains to 2-haloimino-4-thiazoline compounds and a method of preparing these compounds.

I have discovered that 2-imino-4-thiazoline compounds will react with salts of hypohalous acids to produce 2-haloimino-4-thiazolines. The reaction involves only the hydrogen of the imino group of the 2-imino-4-thiazoline and the salt of the hypohalous acid with the result that there is formed a 2-haloimino-4-thiazoline that is, a compound containing the structure

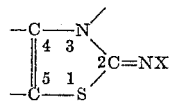

where X is the halogen atom.

Represented structurally the reaction proceeds as follows:

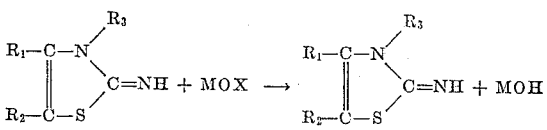

where MOX represents the hypohalite salt, M being the cation of the salt and X being halogen, and each of $R_1$, $R_2$ and $R_3$ represents hydrogen or an organic radical having its connecting valence on a carbon atom.

Any 2-imino-4-thiazoline may be employed to react with the salt of hypohalous acid. While several such compounds have been prepared prior to my investigations, I have disclosed in my copending application Serial No. 193,281, filed October 31, 1950, a convenient method of obtaining numerous 2-imino-4-thiazolines, many of which had not before been prepared, by reacting an enolizable alpha-thiocyano carbonyl compound with a primary amine or salt thereof. When so prepared, as is preferred, $R_1$ and $R_2$ in the above equation represent the non-reactive residue of the alpha-thiocyano carbonyl and $R_3$ represents the organic radical attached to the amino group of the primary amine. The copending application referred to discloses that $R_1$ and $R_2$ can be hydrogen or hydrocarbon groups or radicals containing elements other than hydrogen and carbon present in non-reactive structure as, for example, halogen replacing hydrogen in hydrocarbon groups, oxygen in ether linkages, sulfur in thioether linkages, nitrogen and oxygen in nitro groups, etc. In the present case such groups will not enter into the reaction herein described and may be present in the 2-imino-4-thiazoline reactant.

The above cited copending application also discloses that $R_3$ can be the residue of a wide variety of primary amines as, for example, where $R_3$ is hydrocarbon, a heterocyclic ring, or a radical containing in addition to hydrogen and carbon, such substituents as halogen atoms, nitro groups, ether and thioether linkages and other hydrogen free non-reactive groups as well as hydroxyl, mercapto, carboxyl, sulfonic acid, and other hydrogen-containing substituent groups.

When prepared in the manner of the above-cited copending application, the 2-imino-4-thiazoline is most conveniently obtained in the form of an aqueous solution of its hydrohalide. Such aqueous solution can be employed as a source of the free base for use in this invention merely by adding an alkaline material to the aqueous solution to neutralize the hydrohalide.

Examples of 2-imino-4-thiazolines which can be used as reactants in this invention, either as such or in the form of their hydrohalides, include 2-imino-3-methyl-4-thiazoline, 2 - imino-3,4 - diethyl-4-thiazoline, 2-imino-3,4,5-trimethyl-4-thiazoline, 2 - imino - 3 - methyl-4-ethyl-4-thiazolines, 2-imino-3-isopropyl-4,5-dimethyl-4-thiazoline, 2 - imino-3-butyl-5-methyl-4-thiazoline, 2-imino-3,5-di-isopropyl - 4 - thiazoline, 2-imino-3,5-dipropyl-4-methyl-4-thiazoline, 2-imino-3-amyl-4-hexyl-5-ethyl-4-thiazoline, 2 - imino-3-cyclohexyl-4,5-dimethyl-4-thiazoline, 2-imino-3,5-diallyl-4-methyl - 4 - thiazoline, 2-imino-3-benzyl-4-allyl-5-ethyl-4-thiazoline, 2-imino-3-cyclohexyl - 4 - thiazoline, 2 - imino-3-phenyl-4-thiazoline, 2-imino-4-phenyl-4-thiazoline, 2-imino-3-propyl-4-phenethyl-5-ethyl-4-thiazoline, 2-imino-3,4-dimethyl-5-phenyl-4-thiazoline, 2-imino-3-benzyl-4-methyl-5-phenyl-4-thiazoline, 2-imino - 3-phenyl-4-naphthyl-5-methyl-4-thiazoline, 2-imino-3-naphthyl-4-methyl-5-naphthyl-4 - thiazoline, 2-imino-3,4-diphenyl-4-thiazoline, 2-imino-3,5-dibenzyl-4-thiazoline, 2-imino-3-(3-carboxy-4-hydroxyphenyl) - 4,5 - dimethyl-4-thiazoline, 2-imino-3-(beta - aminomethyl)-4,5-dimethyl-4-thiazoline, 2-imino-3-(beta-chloroethyl)-4,5-dimethyl-4-thiazoline, 2-imino-3-(ortho-hydroxyphenyl)-4,5-dimethyl - 4 - thiazoline, 2-imino-3-(beta - carbomethoxyethyl)-4,5-dimethyl-4-thiazoline, 2-imino-3-(2-furan)-4,5-dimethyl-4-thiazoline, 2-imino-3-(para - nitrophenyl)-4,5-dimethyl-4-thiazoline, 2-imino-3-(methoxypropyl)-4,5-dimethyl - 4 - thiazoline, 2 - imino-3-(ortho - mercaptophenyl)-4,5-dimethyl-4-thiazoline, and 2 - imino - 3 - (ortho - benzene sulfonic acid)-4,5-dimethyl-4-thiazoline.

Any salt of a hypohalous acid may be employed as a reactant in the process of this invention. Water-soluble hypohalites such as the sodium, potassium and ammonium hypochlorites, hypobromites and hypoiodites are preferably used. The hypohalite need not be added per se for, as in other cases, it may be formed in situ by the reaction of the desired halogen with alkali.

Since hypohalites readily decompose at elevated temperatures, the reaction of this invention is carried out at a temperature below room temperature (25° C.), preferably in the range of 0° C. to 15° C. Although when an aqueous solution of the 2-imino-4-thiazoline hydrohalide is employed as reactant, a basic material, preferably a salt of a strong base and a weak acid such as sodium carbonate is also used to form the free imino thiazoline base in situ. The free base is insoluble in water in many cases, and it is therefore preferred to employ an emulsifying or dispersing agent to keep the insoluble free base from precipitating. However, the presence of an emulsifying agent is not critical and can be omitted, if desired. The product of the reaction, the 2-haloimino-4-thiazoline, precipitates out of the aqueous reaction medium even when an emulsifying or dispersing agent is employed. It can be recovered in a rather pure state in yields above 90%.

The specific example which follows, in which all parts are by weight, is merely intended to be a detailed illustration of this invention rather than a limitation thereon.

EXAMPLE I

An aqueous solution containing 17 parts of sodium bicarbonate and 300 parts of water was added to a reactor fitted with a stirrer, a means for externally cooling the reactants and a thermometer for measuring the temperature of the reactants. While stirring this solution, 48 parts (0.2 mole) of 2-imino-3-phenyl-4,5-dimethyl-4-thiazoline hydrochloride dissolved in 100 parts of water were added. The free base, the 2-imino-4-thiazoline, precipitated as a liquid. Then 1.0 part of sodium alkyl naphthylene sulfonate, sold as "Nekal AEM," dissolved in 25 parts of water was added to emulsify the 2-imino-4-thiazoline. The emulsion was cooled to about 5° C. while being stirred vigorously and then 70 parts of an 8.5% (0.16 mole) sodium hypochlorite solution were added at such a rate that the reaction temperature at no time exceeded 10° C. A crystalline precipitate was formed during the reaction and was recovered by filtration. In this manner 45 parts of a crystalline material, a 94% yield, were recovered. This material was purified by dissolving in benzene, adding activated charcoal to the solution, and then recrystallizing the product from the benzene solution. The purified product had a melting point of 92.5° to 98° C. This product was identified as 2-chloroimino-3-phenyl-4,5-dimethyl-4-thiazoline. A chemical analysis of this compound was made with the following percent composition being obtained:

*Chemical composition*

| By Analysis, Percent | Calculated, Percent |
| --- | --- |
| C, 55.35 | C, 55.35 |
| H, 4.71 | H, 4.64 |
| N, 11.74 | N, 11.74 |
| S, 13.50 | S, 13.43 |
| Cl, 14.88 | Cl, 14.85 |

The analysis is in agreement with the chemical composition calculated for 2-chloroimino-3-phenyl-4,5-dimethyl-4-thiazoline $C_{11}H_{11}N_2SCl$.

When potassium hypobromite is substituted for sodium hypochlorite in the above reaction the product obtained is 2-bromoimino-3-phenyl-4,5-dimethyl-4-thiazoline. Similarly when the hypohalite employed as the reactant is sodium hypoiodite, the resulting product is 2-iodoimino-2-phenyl-4,5-dimethyl-4-thiazoline.

For the sake of brevity and simplicity additional examples of the preparation of 2-haloimino-4-thiazoline compounds are set forth in the table which follows wherein the necessary reactants to produce these compounds are indicated.

TABLE I

*Preparation of 2-haloimino-4-thiazoline compounds*

| Example No. | Reactants | | Product |
| --- | --- | --- | --- |
| | Hypohalite | 2-imino-4-thiazoline hydrohalide | |
| II | sodium hypochlorite | 2-imino-3-phenyl-4-ethyl-4-thiazoline hydrochloride. | 2-chloroimino-3-phenyl-4-ethyl-4-thiazoline. |
| III | potassium hypobromite. | 2-imino-3-ethyl-4-thiazoline hydrobromide. | 2-bromoimino-3-ethyl-4-thiazoline. |
| IV | calcium hypochlorite | 2-imino-3-cyclohexyl-4-thiazoline hydrochloride. | 2-chloroimino-3-cyclohexyl-4-thiazoline. |
| V | sodium hypochlorite | 2-imino-3-phenyl-4-thiazoline hydrochloride. | 2-chloroimino-3-phenyl-4-thiazoline. |
| VI | do | 2-imino-3,4,5-trimethyl-4-thiazoline hydrochloride. | 2-chloroimino-3,4,5-trimethyl-4-thiazoline. |
| VII | sodium hypochlorite | 2-imino-3-ethyl-4,5-dimethyl-thiazoline hydrochloride. | 2-chloroimino-3-ethyl-4,5-dimethyl-4-thiazoline. |
| VIII | sodium hypochlorite | 2-imino-3-butyl-5-methyl-4-thiazoline hydrobromide. | 2-chloroimino-3-butyl-5-methyl-4-thiazoline. |
| IX | do | 2-imino-3,5-diisopropyl-4-thiazoline hydrochloride. | 2-chloroimino-3,5-diisopropyl-4-thiazoline. |
| X | sodium hypobromite | 2-imino-3,5-diphenyl-4-thiazoline hydrochloride. | 2-bromoimino-3,5-diphenyl-4-thiazoline. |
| XI | potassium hypobromite. | 2-imino-3,5-dibutyl-4-methyl-4-thiazoline hydrochloride. | 2-bromoimino-3,5-dibutyl-4-methyl-4-thiazoline. |
| XII | sodium hypochlorite | 2-imino-3,4-diphenyl-5-ethyl-4-thiazoline hydrochloride. | 2-chloroimino-3,4-diphenyl-5-ethyl-4-thiazoline. |
| XIII | do | 2-imino-3-phenyl-4-naphthyl-5-methyl-4-thiazoline hydrochloride. | 2-chloroimino-3-phenyl-4-naphthyl-5-methyl-4-thiazoline. |
| XIV | calcium hypochlorite | 2-imino-3,4-diphenethyl-5-ethyl-4-thiazoline hydrochloride. | 2-chloroimino-3,4-diphenethyl-5-ethyl-4-thiazoline. |
| XV | sodium hypochlorite | 2-imino-3-benzyl-4-allyl-5-ethyl-4-thiazoline hydrochloride. | 2-chloroimino-3-benzyl-4-allyl-5-ethyl-4-thiazoline. |
| XVI | sodium hypobromite | 2-imino-3,5-diallyl-4-methyl-4-thiazoline hydrochloride. | 2-bromoimino-3,5-diallyl-4-methyl-4-thiazoline. |
| XVII | potassium hypobromite. | 2-imino-3-amyl-4-phenyl-4-thiazoline hydrochloride. | 2-bromoimino-3-amyl-4-phenyl-4-thiazoline. |
| XVIII | sodium hypochlorite | 2-imino-3-phenyl-5-naphthyl-4-thiazoline hydrochloride. | 2-chloroimino-3-phenyl-5-naphthyl-4-thiazoline. |

The amount of hypohalite necessary to convert the 2-imino-4-thiazoline compound to the 2-haloimino-4-thiazoline in good yield can be varied from slightly less than equimolecular proportions, about 0.8 mole of hypohalite, where the same halogen is present in both the hypochlorite and in the imino-thiazoline hydrohalide, to about 2 moles of hypohalite per mole of imino thiazoline compound. But, in general, substantially equimolecular proportions of hydrohalite and imino-thiazoline will produce satisfactory results.

The 2-haloimino-4-thiazolines of this invention are useful as reactants in the synthesis of other organic compounds, for the halogen atom attached to the imino nitrogen atom is exceedingly active. For example, these haloimino-4-thiazolines will react quite readily with mercaptides to form sulfenimides as described in my copending application Ser. No. 205,227, filed January 3, 1951.

It will be understood, that the precise proportions of the reactants employed may be varied and that equivalent chemical compounds may be employed, if desired, since these modifications and variations do not depart from the spirit and scope of this invention as defined in the appended claims:

I claim:

1. The method which comprises reacting in an aqueous medium a water-soluble salt of a hypohalous acid with a compound having the structure

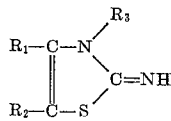

where $R_1$, $R_2$ and $R_3$ are members of the class consisting of hydrogen and hydrocarbon groups containing from one to ten carbon atoms at a temperature of from 0° to 25° C. thereby to form a compound having the structure

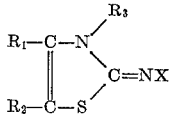

where X is a halogen atom and $R_1$, $R_2$ and $R_3$ are members of the class consisting of hydrogen and hydrocarbon groups containing from one to ten carbon atoms.

2. The method which comprises reacting in an aqueous medium a compound having the structure

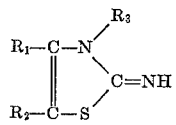

where $R_1$, $R_2$ and $R_3$ are members of the class consisting of hydrogen and hydrocarbon groups containing from one to ten carbon atoms with a water-soluble salt of hypochlorous acid, at a temperature between 0° C. and 25° C. thereby to form a compound having the structure

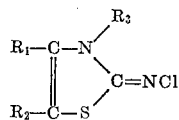

where $R_1$, $R_2$ and $R_3$ are members of the class consisting of hydrogen and hydrocarbon groups containing from one to ten carbon atoms.

3. The method which comprises reacting in an aqueous medium 2-imino-3-phenyl-4,5-dimethyl-4-thiazoline with sodium hypochlorite at a temperature of from 5° C. to 10° C., thereby to form 2 - chloroimino - 3 - phenyl - 4,5 - dimethyl - 4-thiazoline.

4. A compound having the formula

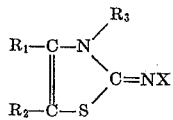

where $R_1$, $R_2$ and $R_3$ are members selected from the group consisting of hydrogen, and hydrocarbon groups containing from one to ten carbon atoms, and X is a halogen atom.

5. A compound having the formula

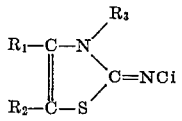

where $R_1$, $R_2$ and $R_3$ are selected from the class consisting of hydrogen and hydrocarbon groups containing from one to ten carbon atoms.

6. 2 - chloroimino - 3 - phenyl - 4,5 - dimethyl-4-thiazoline.

JAMES T. GREGORY.

No references cited.